(12) United States Patent
Bollella et al.

(10) Patent No.: US 7,484,067 B1
(45) Date of Patent: Jan. 27, 2009

(54) SYSTEM AND METHOD FOR ENSURING NON-INTERFERING GARBAGE COLLECTION IN A REAL TIME MULTI-THREADED ENVIRONMENT

(75) Inventors: Gregory Bollella, Grenoble (FR); Christophe Lizzi, Meylan (FR); Laurent P. Daynes, Saint Ismier (FR)

(73) Assignee: Sun Microsystems, Inc., Santa Clara, CA (US)

( * ) Notice: Subject to any disclaimer, the term of this patent is extended or adjusted under 35 U.S.C. 154(b) by 813 days.

(21) Appl. No.: 11/135,958

(22) Filed: May 24, 2005

Related U.S. Application Data (60) Provisional application No. 60/574,196, filed on May 24, 2004.

(51) Int. Cl.
*G06F 12/00* (2006.01)
*G06F 13/00* (2006.01)
*G06F 13/28* (2006.01)

(52) U.S. Cl. ..................... 711/170; 707/206
(58) Field of Classification Search .............. 707/206; 711/170
See application file for complete search history.

(56) References Cited

U.S. PATENT DOCUMENTS 5,842,016 A * 11/1998 Toutonghi et al. .......... 718/106
6,865,585 B1 * 3/2005 Dussud ..................... 707/206

2003/0097537 A1 * 5/2003 Bollella et al. .............. 711/170

OTHER PUBLICATIONS

Corsaro, Angelo and Cytron, Ron K., "Efficient Memory-Reference Checks for Real-time Java", Jun. 11, 2003, pp. 52-53.*

* cited by examiner

*Primary Examiner*—Sanjiv Shah
*Assistant Examiner*—Mark A Giardino, Jr.
(74) *Attorney, Agent, or Firm*—Park, Vaughan & Fleming LLP (57) ABSTRACT

A system and method for ensuring non-interfering garbage collection in a real time multi-threaded environment. An incarnation counter is associated with a scoped memory area. The incarnation counter is atomically updated upon access by a no heap thread not interruptible by garbage collection operations. A write stub is identified and includes instructions to store data into storage locations of the scoped memory area. The instructions are dynamically modified to interrupt execution of a garbage collection thread. A garbage collection thread is executed over the scoped memory area. At least one of a read from the scoped memory area and a write to the scoped memory area are attempted. For the read attempt, an incarnation number is read from the incarnation counter of the scoped memory area and is locally stored. A value from a storage location in the scoped memory area is loaded and the incarnation number is reread. The reread incarnation number is compared with the locally stored incarnation number. The garbage collection thread is interrupted when the reread and locally stored incarnation numbers fail to match. For the write attempt, the instructions in the write stub are executed. The instructions include one of storing data into one such location in the scoped memory area and interrupting execution of the garbage collection thread.

20 Claims, 7 Drawing Sheets

SYSTEM AND METHOD FOR ENSURING NON-INTERFERING GARBAGE COLLECTION IN A REAL TIME MULTI-THREADED ENVIRONMENT

CROSS-REFERENCE TO RELATED APPLICATION

This non-provisional patent application claims priority under 35 USC § 119(e) to U.S. provisional patent application Ser. No. 60/574,196, filed 24 May 2004, the disclosure of which is incorporated by reference.

FIELD OF THE INVENTION

The invention relates in general to multi-threaded operations and, in particular, to a system and method for ensuring non-interfering garbage collection in a real time multi-threaded environment.

BACKGROUND OF THE INVENTION

Managed code platforms can present a machine-independent and architecture-neutral operating environment, such as provided by the Java operating environment, which is described in P. van der Linden, "Not Just Java," Ch. 3, Sun Microsystems, Inc. (1997), the disclosure of which is incorporated by reference. Managed code environments are capable of providing real time execution, but ensuring such execution can be problematic due to the unpredictable latencies introduced by garbage collection mechanisms. Real time threads must be guaranteed to proceed within fixed timeliness constraints, yet other concurrent threads, particularly garbage collection threads, can potentially cause execution interference or memory corruption, absent appropriate programmatic safeguards.

Real time execution is supported in the Java operating environment, as specified in the Real-Time Specification for Java (RTSJ). Under the RTSJ, two classes of real time threads, real time (RT) threads and no-heap real time (NHRT) threads, are defined, in addition to the normal class of threads specified by the Java programming language. NHRT threads carry out execution in either immortal or scoped memory areas, which are both subject to storage reclamation that is controlled under well-defined rules not under garbage collection control. RT threads additionally carry out execution in heap storage and can assign references to heap-defined objects into objects allocated in the scoped memory area.

Garbage collection proceeds under mutual exclusion with all normal and RT threads, but is subject to preemption by NHRT threads. Storage objects allocated in a scoped memory area can only be reclaimed in the interval between inactive and active states, termed the dead zone, when the number of threads operating on the scoped memory area drops to zero.

Garbage collection preemption can create two particularized issues, where a linear garbage collection scan of a scoped memory area is temporarily interrupted. An unsynchronized read of the thread counter is sufficient to identify inactive scoped memory area, even if the counter value changes while being read by the garbage collector thread. If the thread counter value read is consistent, that is, no concurrent changes occurred, the garbage collector thread can safely proceed. However, if the thread counter value was changed during the read, two issues may arise. First, if a non-zero value was decreased to zero, the garbage collector thread will erroneously consider the scoped memory area active and perform a scan, even though performing such a scan is unnecessary and inefficient, as the scoped memory area has become inactive. Second, if a zero value was increased, the garbage collector thread will erroneously consider the scoped memory area inactive and not perform a scan. Although, strictly speaking, not problematic, updated references to heap objects relocated by the garbage collector thread will be written into the scoped memory area.

Two further problems could occur in a multiprocessing environment in which garbage collection executes on a processor distinct from one or more concurrently executing NHRT threads. Such actions could result in execution errors, memory corruption, or system crash. A similar set of problems could also occur in a uniprocessing environment. First, a scoped memory area could enter a dead zone during a garbage collection scan due to preemption. Ideally, garbage collection on that scoped memory area should stop because all stored objects are "dead" and further processing would be inefficient. Second, the NHRT threads could overrun the preempted garbage collector thread and allocate objects past the current position of the garbage collector thread. Once restarted, the garbage collector thread could incorrectly overwrite any scoped memory area locations previously interpreted as storing heap object references or could incorrectly interpret previously-read values at now-overwritten scoped memory area locations as class descriptor pointers or heap object references.

Therefore, there is a need for an approach to preventing program error and failures and memory corruption without introducing interferences to real time threads and, in particular, to NHRT threads, due to concurrent garbage collection activities.

SUMMARY OF THE INVENTION

A system and method for synchronizing non-interfering garbage collection in a real time capable operating environment is provided. Two groups of operations are defined to allow a garbage collector thread to read from and write to a scoped memory area without interfering with concurrently executing NHRT threads. A monotonically-increasing incarnation number is atomically incremented by executing NHRT and RT threads upon entry into the scoped memory area. To ensure a non-interfering read by a garbage collector thread, the incarnation number is read under a memory barrier and stored prior to the loading of a value from a selected location in the scoped memory area. The incarnation number is subsequently re-read under a memory barrier, and, if differing from the stored value, further processing of the scoped memory area is stopped. To ensure a non-interfering write by a garbage collector thread, instructions that implement a store operation by the garbage collector thread into a location in the scoped memory area are located in a buffer, known as a garbage collector write stub. The instructions are modified by an NHRT thread to interrupt scanning of the scoped memory area upon an attempt to write a value by the garbage collector thread. The modified instructions are reversed by an RT thread upon subsequently entering the scoped memory area. Thus, during execution of the garbage collector write stub, the garbage collector thread will either be interrupted from scanning further or will be allowed to write a value into a location in the scoped memory area without risk of corrupting the content.

One embodiment provides a system and method for ensuring non-interfering garbage collection in a real time multi-threaded environment. An incarnation counter is associated with a scoped memory area. The incarnation counter is atomically updated upon access by a no heap thread not interruptible by garbage collection operations. A write stub is identified and includes instructions to store data into storage locations of the scoped memory area. The instructions are dynamically modified to interrupt execution of a garbage collection thread. A garbage collection thread is executed over the scoped memory area. At least one of a read from the scoped memory area and a write to the scoped memory area are attempted. For the read attempt, an incarnation number is read from the incarnation counter of the scoped memory area and is locally stored. A value from a storage location in the scoped memory area is loaded and the incarnation number is reread. The reread incarnation number is compared with the locally stored incarnation number. The garbage collection thread is interrupted when the reread and locally stored incarnation numbers fail to match. For the write attempt, the instructions in the write stub are executed. The instructions include one of storing data into one such location in the scoped memory area and interrupting execution of the garbage collection thread.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Real Time Multi-Threaded Environment

Figure 1:
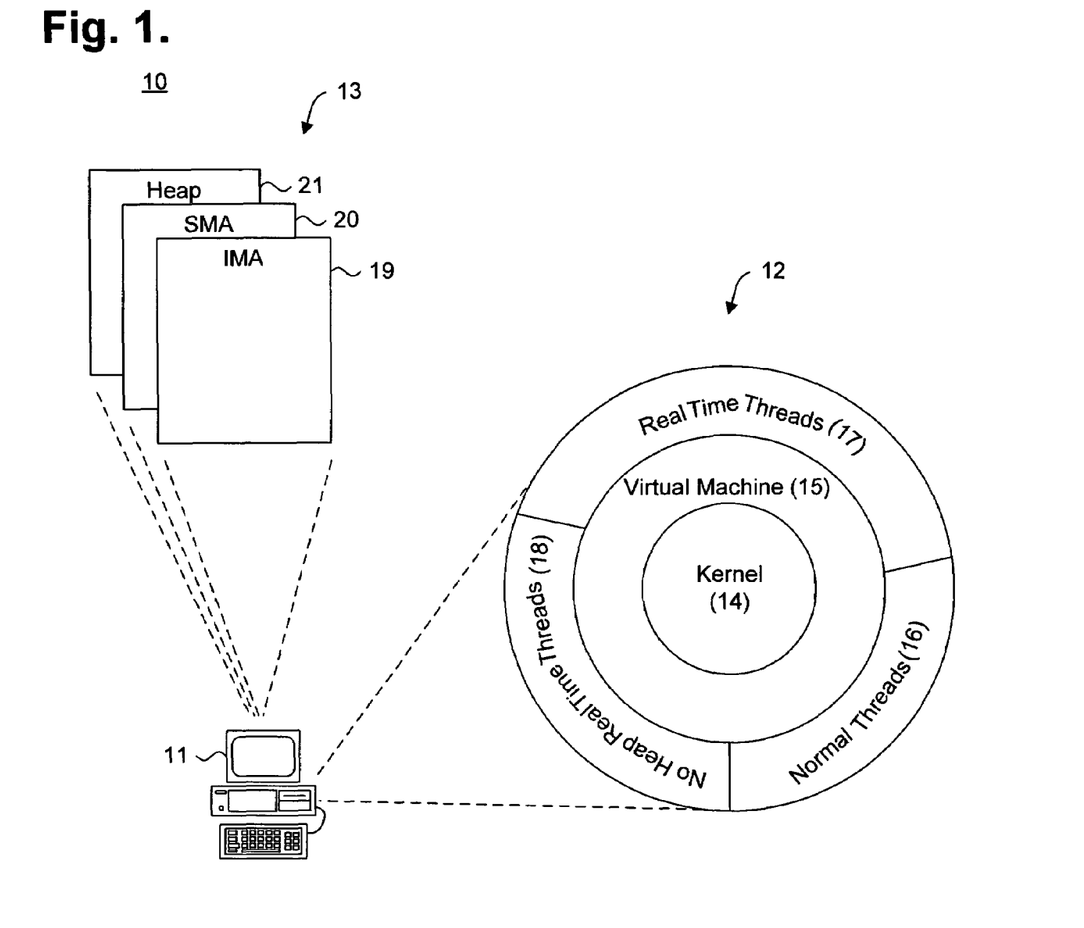
FIG. 1 is a block diagram showing, by way of example, a multi-threaded, real time operating environment, in accordance with one embodiment.

Managed code platforms, such as the Java operating environment, supra, can provide multi-threaded, real time execution, subject to timeliness constraints posited to ensure predictable program behavior. Although described herein with reference to an implementation in conformity with the RTSJ, other types of multi-threaded, real time operating environments are possible. Thus, FIG. 1 is a block diagram showing, by way of example, a multi-threaded, real time operating environment 10, in accordance with one embodiment. The multi-threaded environment 10 has three logically-defined layers 12, including operating system kernel 14, virtual machine 15, and threads 16-18. A computer system 11, operating under the control of the kernel 14, executes a virtual machine 15 to provide a managed code platform. Through the virtual machine 15, multiple process threads, including normal threads 16, real time (RT) threads 17, and no heap real time (NHRT) threads 18, execute.

The virtual machine 15 manages memory 13 for executing threads through logically-defined areas that can be used for the dynamic allocation of objects. The immortal memory area (IMA) 19 is used for objects that, once allocated, exist until the termination of the virtual machine 15. The scoped memory area (SMA) 20 is used for objects with lifetimes defined by scope. Finally, the heap 21 is used to manage objects with lifetimes defined by reachability. Other types of memory areas, including physical memory (not shown), are possible.

The NHRT threads 18 carry out execution in memory areas where storage reclamation is performed in accordance with well-defined rules not under garbage collection control to ensure predictable execution. In one embodiment, NHRT threads 18 are restricted to the immortal memory areas 19 and scoped memory areas 20. RT threads 17 carry out execution in the immortal memory areas 19, scoped memory areas 20, and heap 21. Both RT threads 17 and NHRT threads 18 can enter a scoped memory area 20 and allocate, read, or write objects. NHRT threads 18 may neither read nor write references to heap objects, as further described below with reference to FIG. 2. RT threads 17, however, can assign references to heap objects into objects defined in the scoped memory area 20, as further described below with reference to FIG. 3. In one embodiment, an attempt by an NHRT thread 18 to either allocate a heap object or to store a reference to a heap object will cause an exception to be thrown by the virtual machine 15.

Garbage collection activities are not allowed to interfere with execution of NHRT threads 18. Specifically, garbage collectors may not prevent an NHRT thread from making progress and any ongoing garbage collection activity can be preempted at any time by an NHRT thread 18. Nevertheless, absent programmatic safeguards as further described below beginning with reference to FIG. 5 et seq., interferences can potentially occur when the garbage collector thread reads a scoped memory area 20 to determine the liveness of referenced heap objects or to write content into the scoped memory area 20 to update relocated heap object references.

Real Time Threads

Figure 2:
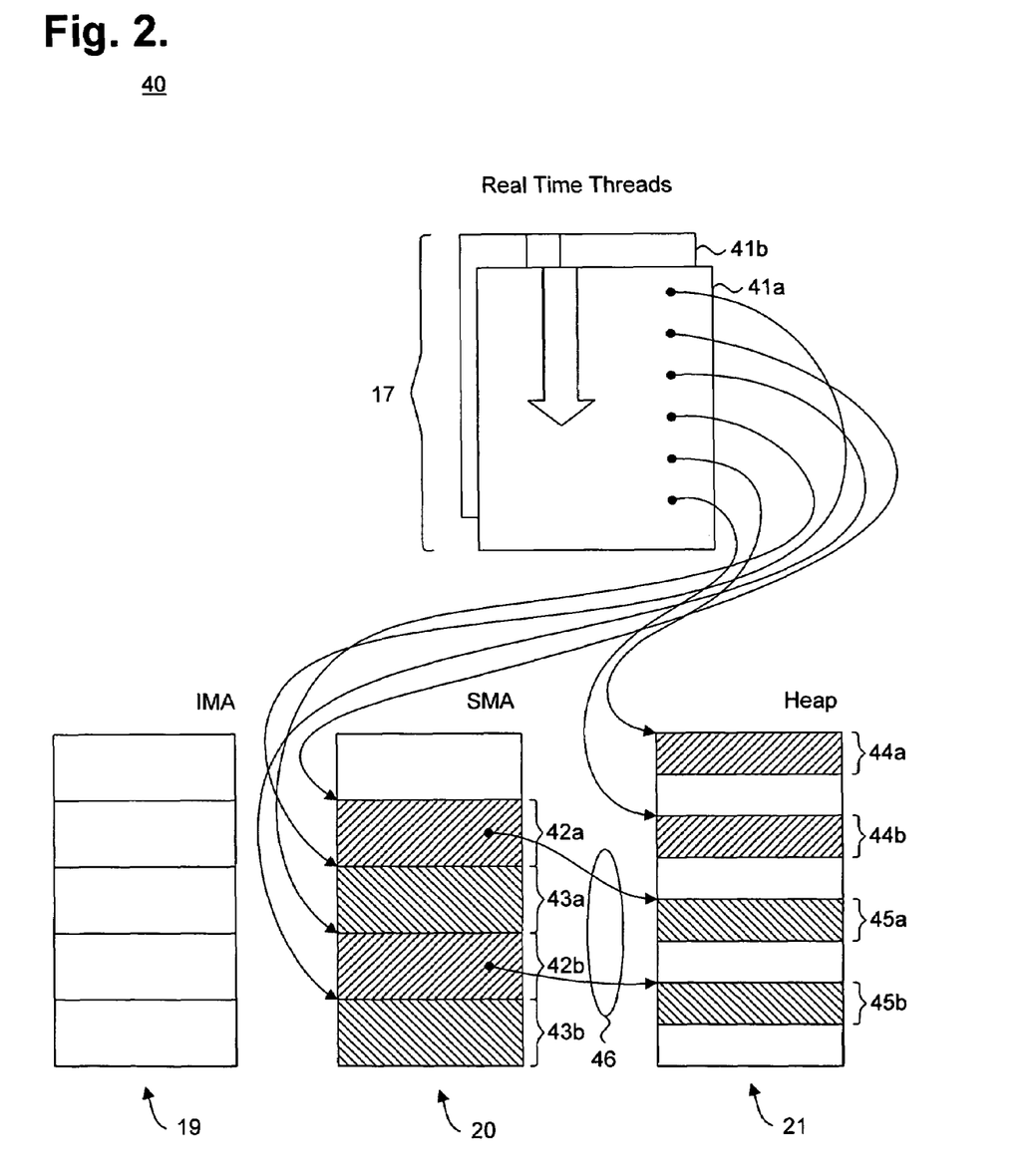
FIG. 2 is a block diagram showing no heap real time threads and memory areas in the operating environment of FIG. 1.

RT threads 17 can allocate, read, or write objects in immortal memory areas 19, scoped memory areas 20, and heap 21. FIG. 2 is a block diagram 40 showing RT threads 17 and memory areas 19, 20, 21 in the operating environment 10 of FIG. 1. For simplicity, only the scoped memory areas 20 and heap 21 will be discussed. Each instance 41a, 41b of an RT thread 17 can dynamically allocate memory for objects in storage locations 42a, 42b, 43a, 43b in scoped memory area 20 and 44a, 44b, 45a, 45b in the heap 21, respectively. Storage locations 42a, 42b in the scoped memory area 20 can store references 46 to storage locations 45a, 45b in the heap 21.

Storage objects allocated in the heap 21 can be reclaimed by a garbage collector thread (not shown). Storage objects allocated in the scoped memory area 20 can only be reclaimed when the scoped memory area 20 is in a dead zone. Preemption of garbage collection activities by NHRT threads 18 must be coordinated to avoid execution interference and memory corruption, as further described below with reference to FIGS. 4A-D. For instance, a garbage collector thread may need to read scoped memory area content to determine the liveness of referenced heap objects. Similarly, a garbage collector thread may need to write scoped memory area content to update references to heap objects that were reallocated or moved. Other types of garbage collection activities may also require coordination.

NHRT Threads

Figure 3:
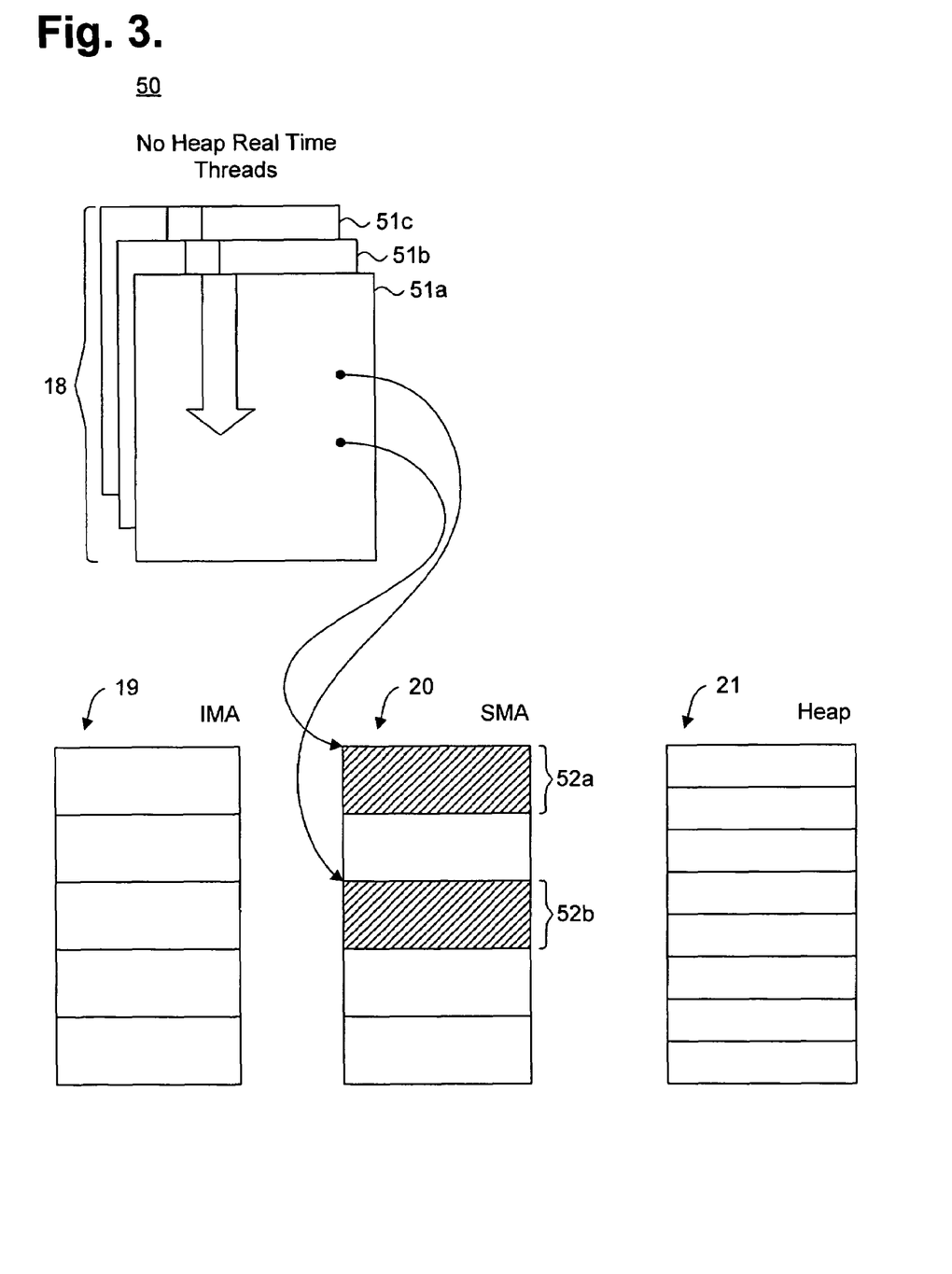
FIG. 3 is a block diagram showing real time threads and memory areas in the operating environment of FIG. 1.

NHRT threads 18 are restricted to scoped memory areas 20 and immortal memory areas 19. FIG. 3 is a block diagram 50 showing NHRT threads 18 and memory areas 19, 20, 21 in the operating environment 10 of FIG. 1. For simplicity, only the scoped memory area 20 and heap 21 will be discussed. Each instance 51a, 51b, 51c of an NHRT thread 18 can dynamically allocate memory for objects in storage locations 52a, 52b in scoped memory area 20. However, references to heap objects may not be stored by an NHRT thread 18 in the SMA 20, nor may storage locations in the heap 21 be directly allocated by an NHRT thread 18.

Storage objects allocated in the scoped memory area 20 can only be reclaimed when the scoped memory area 20 is in an inactive state, known as a dead zone, which occurs when the number of threads operating on the scoped memory area 20 is zero. When the scoped memory area 20 enters a dead zone, all storage objects become reclaimable or dead. Any reclamation of storage objects in the scoped memory area 20 must be completed before the scoped memory area 20 leaves the dead zone. In one embodiment, storage objects in the scoped memory area 20 are allocated linearly by maintaining a cursor pointing to the last allocated byte. Upon each allocation, the cursor is incremented by the requested amount of bytes. Reclamation simply resets the cursor to point to the first byte of the scoped memory area 20.

Unsynchronized Garbage Collection

Garbage collection unsynchronized with NHRT threads 18 can potentially result in system failure or memory corruption. FIGS. 4A-D are timing diagrams 60-63 showing, by way of example, potential synchronization problems resulting from prior art unsynchronized garbage collection. As a scoped memory area 20 can include objects storing references to heap objects created by RT threads 17, a garbage collector thread may read storage locations from a scoped memory area 20 and interpret the read values as references to heap objects or references to class descriptions. Similarly, a garbage collector thread may write to storage locations in a scoped memory area 20 to store a new location of heap object that has been relocated or moved.

In one embodiment, garbage collection is performed based on several assumptions. All objects in an active scoped memory area 20 are assumed to be live. Garbage collection operates on each active scoped memory area 20 by scanning linearly from the address of the first allocated storage location to the address of the last allocated byte. References to heap objects are identified and processed, either by following the reference or modifying the reference, as necessary. The linear scan of each scoped memory area 20 is bounded by the value of the allocation cursor read at the time that garbage collection is started. Scanning can cease after the noted allocation cursor position since only NHRT threads 18 can enter a scoped memory area 20 concurrent to garbage collection. Consequently, the scoped memory area 20 will not contain any further references to heap objects. Each scoped memory area 20 that was inactive, that is, in a dead zone, at the time that garbage collection started can also be ignored, as only NHRT threads 18 can activate an inactive scoped memory area 20 concurrent to garbage collection. Nevertheless, conventional garbage collection activities which lack synchronization with NHRT threads 18 can lead to system failures or memory corruption.

Figure 4A:
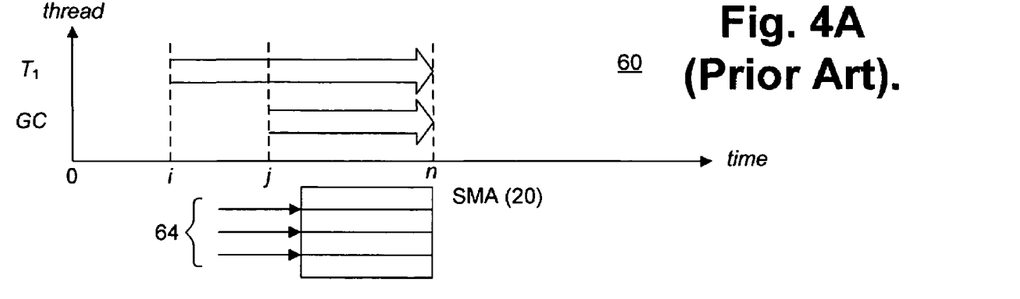
FIGS. 4A-D are timing diagrams showing, by way of example, potential synchronization problems resulting from prior art unsynchronized garbage collection.

Referring first to FIG. 4A, an NHRT thread $T_1$ and a garbage collector thread GC are executing concurrently on a multi-processor architecture with the garbage collector GC running on a distinct processor. Normal threads 16 and RT threads 17 are not allowed to run while a garbage collector thread is executing. Assuming that the NHRT thread $T_1$ began execution at time i and the garbage collector thread GC began execution subsequently at time j, the garbage collector thread GC will have identified any live heap object references 64 in the scoped memory area 20 that need to be updated to refer to new storage locations in the heap at time n.

Figure 4B:
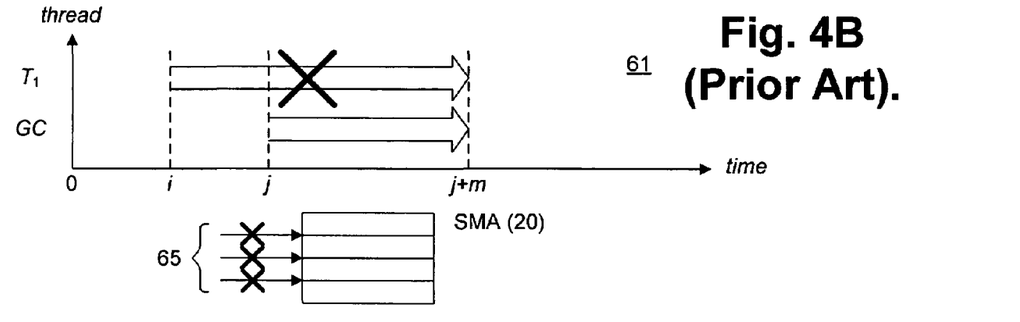

Referring next to FIG. 4B, assume that the NHRT thread $T_1$ terminates at time j+m, while m>n, putting the scoped memory area 20 into an inactive state, that is, in a dead zone. By implication, the set of previously-identified references 64 will now be inactive or dead 65.

Figure 4C:
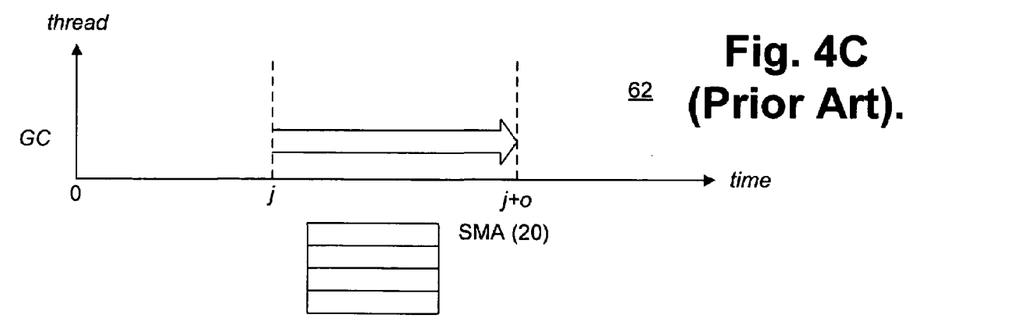

Referring next to FIG. 4C, the garbage collector thread GC continues scanning the scoped memory area 20 through time j+o, where o>m. However, as the scoped memory area 20 is in a dead zone, continuing to process the scoped memory area 20 is inefficient and unnecessarily wastes processor cycles.

Figure 4D:
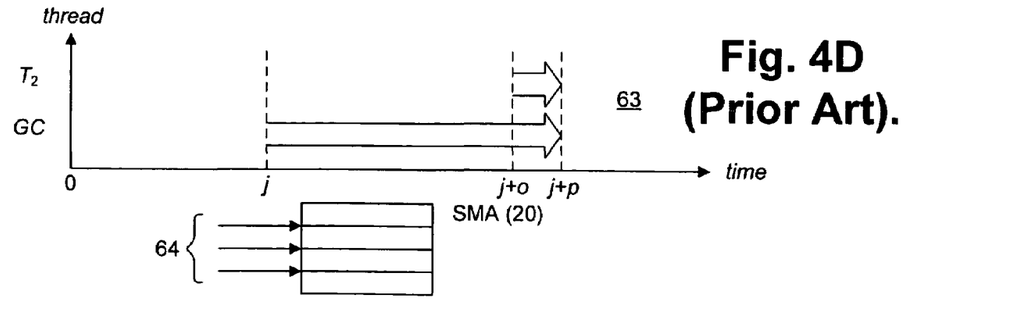

Referring finally to FIG. 4D, a second NHRT thread $T_2$ also begins execution at time j+o. The execution of the second NHRT thread $T_2$ activates the scoped memory area 20, which causes the scoped memory area 20 to leave the dead zone, and the second NHRT thread $T_2$ then allocates one or more objects in the scoped memory area 20 up to and beyond the current cursor of the garbage collector thread GC. At a later time, such as time j+p, where p>o, the activation of the scoped memory area 20 by the second NHRT thread $T_2$ could create two problems. First, if the garbage collector thread GC reads a storage location in the scoped memory area 20 overwritten by the second NHRT thread $T_2$ and treats the value read from the storage location as holding a reference to a class description or to a heap object, a system error could occur. Second, if the garbage collector thread GC writes to a storage location in the scoped memory area 20 that the garbage collector thread GC assumes to contain a reference to a heap object that requires updating, the writing could corrupt the content of the object just allocated by the second NHRT thread $T_2$, thereby leading to memory corruption that in turn could cause a type safety violation or system crash.

Synchronized Garbage Collection

Figure 5:
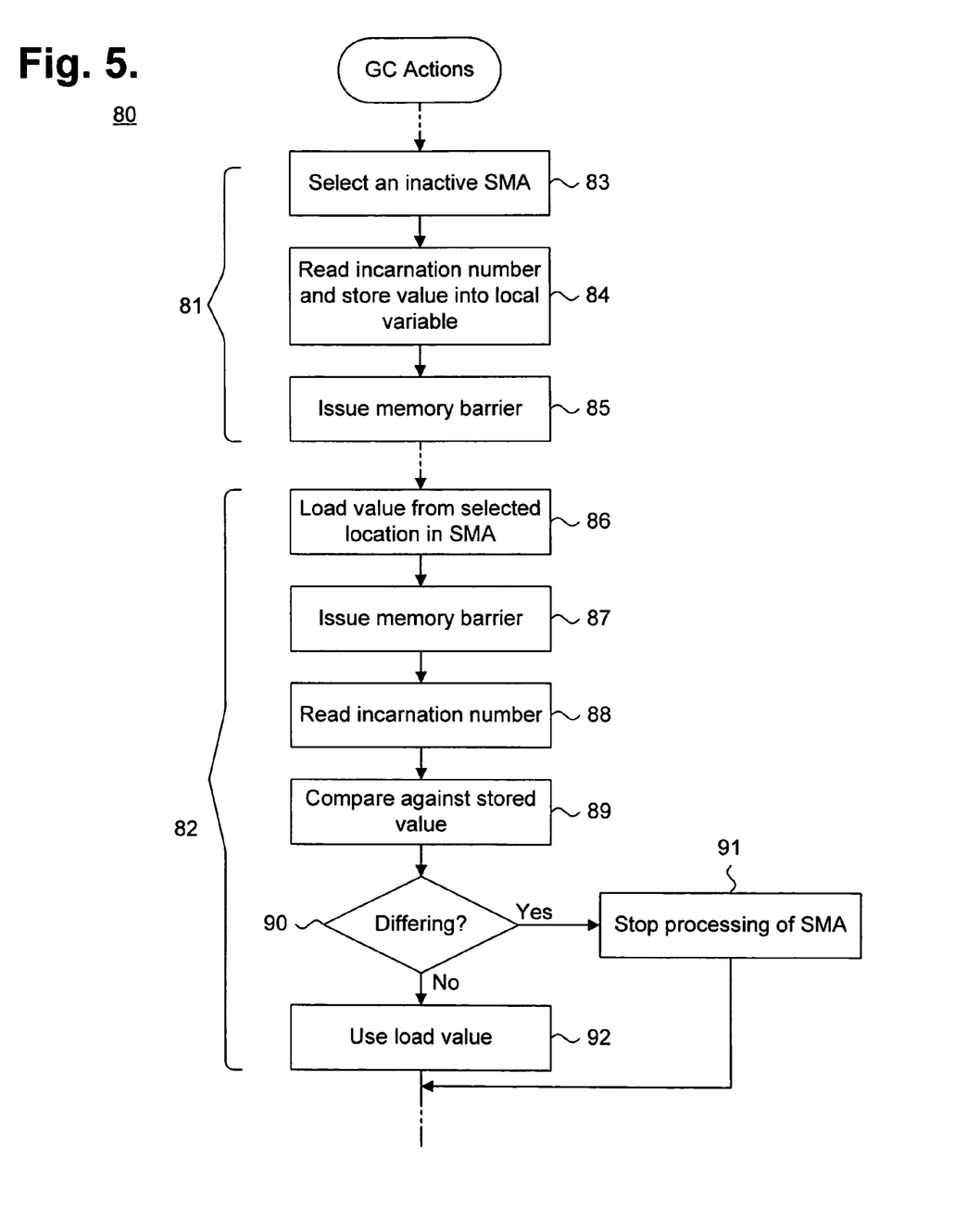
FIG. 5 is a flow diagram showing garbage collector thread actions for use in the operating environment of FIG. 1.

In one embodiment, the operations performed by garbage collector and NHRT threads, and, in a further embodiment, RT threads, are modified to synchronize garbage collection activities to scoped memory area state without locking NHRT thread progress, as further described below with reference to FIG. 5 et seq. The modifications allow a garbage collector thread to determine the liveness of an object stored in a scoped memory area 20 currently being scanned, but possibly having been modified in the interim by a concurrent preempting NHRT thread that has overtaken the garbage collector thread. The modifications can also interrupt the scanning when necessary to avoid the overwriting of a storage location in the scoped memory area 20 that has been modified by the NHRT thread.

The modifications have three components. First, public incarnation number counts the number of times that a scoped memory area 20 transitions from an inactive state to an active state. In one embodiment, the incarnation number is increased monotonically, although the incarnation number could also be decremented or otherwise updated to reflect changes in scoped memory area state. The incarnation number is initialized to zero upon creation of the scoped memory area 20 and is atomically increased whenever an RT or NHRT thread activates the scoped memory area. During a garbage collection, incarnation numbers can only be increased by NHRT threads. Second, an instruction buffer containing scoped memory area storing instructions is dynamically patched to prevent locations within the scoped memory area 20. Finally, in a further embodiment, cross-CPU interruption is introduced to force a garbage collection thread to accept instructions buffer modifications if still scanning when an NHRT thread enters the scoped memory area 20.

Garbage collection synchronization is provided for reading from and writing to storage locations in a scoped memory area 20. Garbage collector thread reads are protected through use of the incarnation number to ensure that values read from a scoped memory area are live and can safely be used as pointers to class descriptors or references to other objects, including live heap objects. Garbage collector writes are protected through dynamic instruction modification to interrupt the storing of content into a scoped memory area that has already been changed by NHRT thread.

Garbage Collection Thread Actions

Each garbage collector thread uses the incarnation number to ensure the safe reading of values from storage locations in a scoped memory area 20. FIG. 5 is a flow diagram 80 showing garbage collector thread actions 81, 82 for use in the operating environment 10 of FIG. 1. The garbage collector thread actions are loosely divided into two groups of actions 81, 82 that are respectively performed upon initially entering an inactive scoped memory area 20 and during the reading of a value from a storage location in a scoped memory area.

Initially, an inactive scoped memory area 20 is selected (block 83) and the incarnation number is read and stored into a local variable (block 84). A memory barrier is issued (block 85) to guarantee completion of the load before proceeding to reading values from the scoped memory area 20.

When reading a value from a storage location in the scoped memory area 20, the value is first loaded (block 86) and a memory barrier is issued (block 87) to guarantee completion of the load before any subsequent loads enter the instruction stream. The incarnation number is re-read (block 88). The value of the read incarnation number is compared to the value stored in the local variable (block 89). If the values differ (block 90), garbage collection processing of the scoped memory area 20 is stopped (block 91), as the scoped memory area 20 has entered a dead zone. Otherwise, if the values are the same (block 90), the loaded value can safely be used (block 92), as the value has not been modified by an preempting and overtaking NHRT thread 18 since started execution after garbage collection activities began.

Issuing memory barriers and reading the incarnation number each time a storage location is read can be computationally expensive. In a further embodiment, the cost can be amortized by using a temporary buffer to read one section of the scoped memory area 20 with each load, instead of loading just a single storage location. The temporary buffer is loaded with the current section of the scoped memory area 20 being processed, a memory barrier is issued, and the incarnation number is checked. If the incarnation number remains consistent, the values stored in the temporary buffer are correct and cannot be misinterpreted by the garbage collector thread. In a still further embodiment, values from only a specific location of interest in the scoped memory area 20 are read. For instance, the only header of an object and all object references might be loaded into the temporary buffer prior to checking for the incarnation number. Other forms of protected loads of values stored in a scoped memory area 20 are possible.

NHRT Thread Actions

Figure 6:
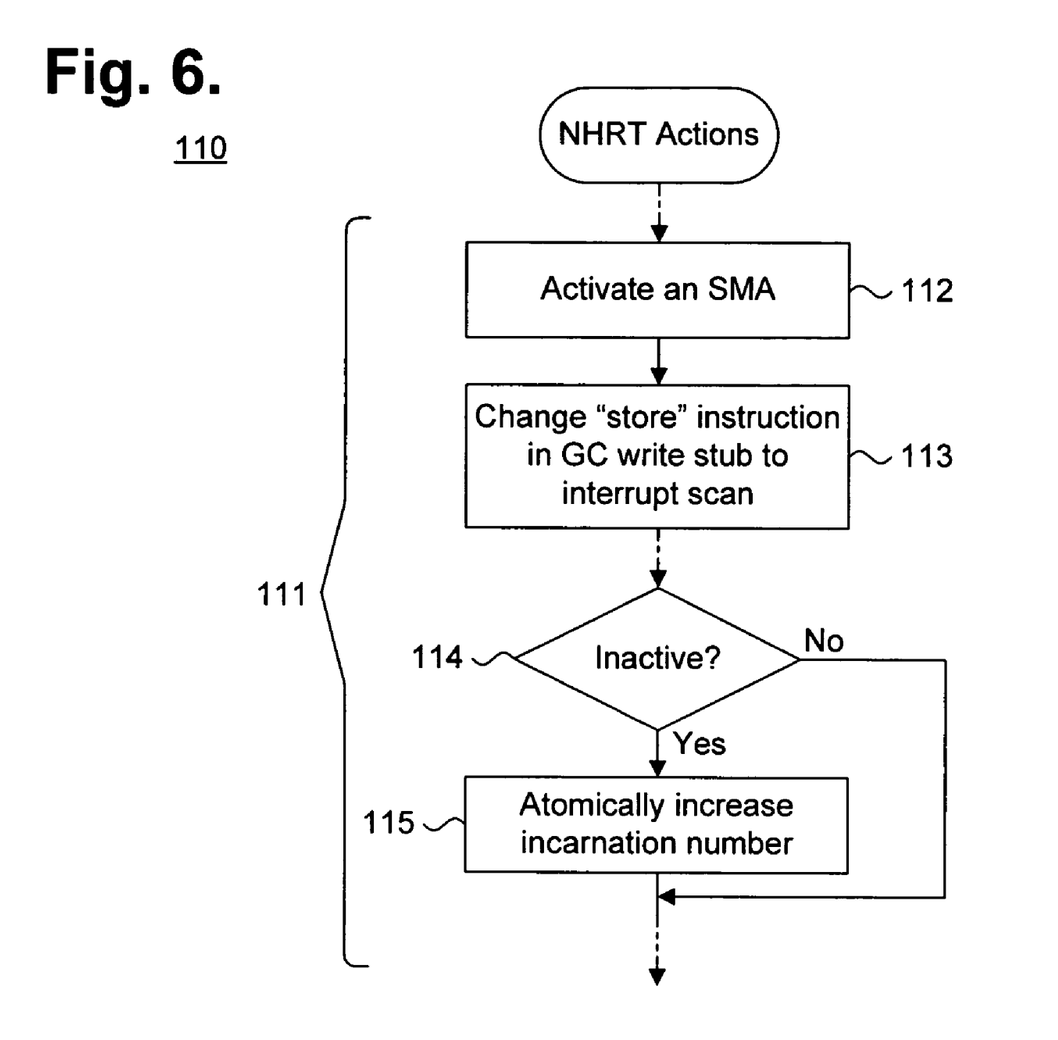
FIG. 6 is a flow diagram showing no heap real time thread actions for use in the operating environment of FIG. 1.

Code containing instructions executed by a garbage collector thread to update the contents of storage locations in a scoped memory area is stored in a buffer, known as a garbage collector write stub, associated with the scoped memory area 20. The address of each garbage collector write stub is associated with the scoped memory area 20. The instructions can be modified and reverted respectively by NHRT threads 18 and RT threads 17. FIG. 6 is a flow diagram 110 showing NHRT thread actions 111 for use in the operating environment 10 of FIG. 1. Only a single group of actions 111 need be performed to modify garbage collector write stubs. Initially, a scoped memory area 20 is activated (block 112) upon entry into the scoped memory area 20 by an NHRT thread 18. The "store" instruction in the garbage collector write stub is modified by the NHRT thread 18 with a "branch" instruction that routes execution of the code to interrupt the scanning of the scoped memory area 20 (block 113). Additionally, if the scoped memory area was formerly inactive (block 114) the incarnation number is atomically increased (block 115). In one embodiment, the modified instructions do not interrupt the garbage collector thread itself, but only interrupt the scanning of the scoped memory area 20 associated with the garbage collector write stub. The interruption guarantees that the garbage collector thread will not overwrite any storage location once the scoped memory area 20 has entered a dead zone.

In a further embodiment, a cross-CPU interrupt may be required on multi-processor machines that are based on modern deeply pipelined processor architectures to guarantee that the change of instructions in the garbage collector write stub is made globally visible to all processors. For instance, the "store" instruction may already be in an instruction pipeline and is about to be performed.

Such cross-CPU interrupts may be expensive and, in a still further embodiment, each scoped memory area 20 can be augmented with an activity variable indicating whether a garbage collector thread is currently running over the scoped memory area 20. The activity variable is set to the garbage collector thread identifier prior to scanning, and is reset to zero when upon either normal termination or interrupt. An NHRT thread 18 activating a scoped memory area 20 consults the activity variable following activation, including patching of the "store" instruction, to determine whether a garbage collector thread is still scanning. If scanning is still in progress, a cross-CPU interrupt directed at the garbage collector thread is performed.

RT Thread Actions

Figure 7:
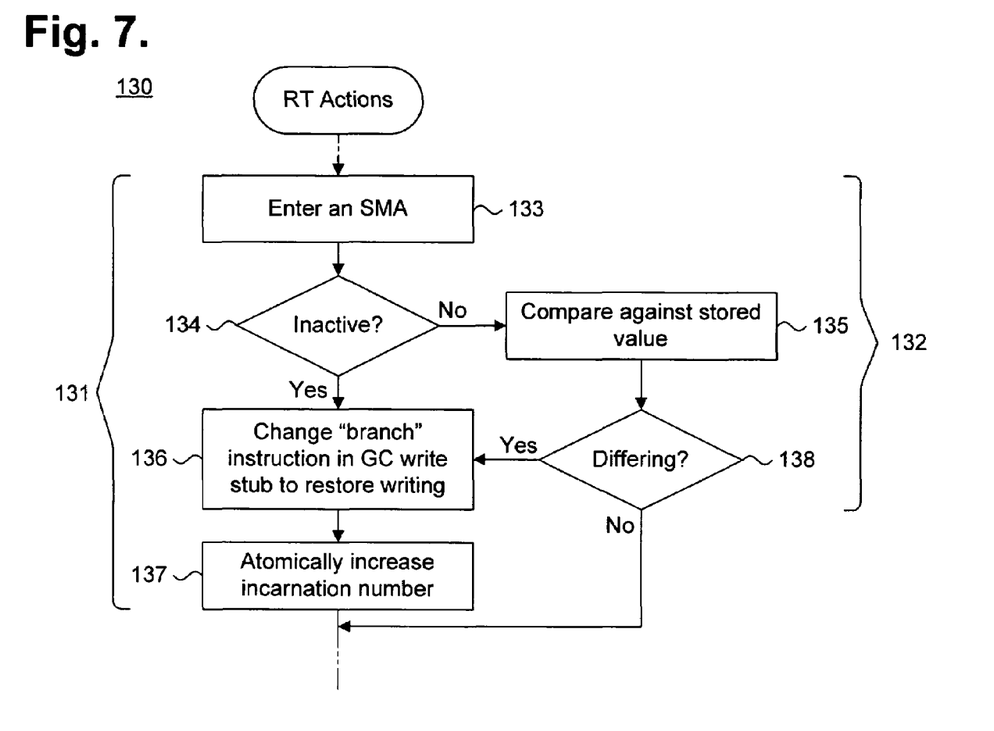
FIG. 7 is a flow diagram showing real time thread actions for use in the operating environment of FIG. 1.

RT threads 17 reverse the patching of a garbage collector write stub. Optimally, the garbage collector write stub patching only need be reversed when a heap object reference is written into a storage location in a scoped memory area 20, which can only be carried out by an RT thread 17 entering the scoped memory area 20. FIG. 7 is a flow diagram 130 showing RT thread actions 131,132 for use in the operating environment of FIG. 1. The RT thread actions are loosely divided into two groups of actions 131, 132 that are respectively performed for inactive and active scoped memory areas. Initially, the scoped memory area 20 is entered (block 133) and, if active (block 134), the current incarnation number is compared against a previously-stored incarnation number value (block 135). If the values differ (block 138), the "branch" instruction in the garbage collector write stub is modified to restore writing of values into the scoped memory area 20. Similarly, if the scoped memory area 20 is inactive (block 134), the "branch" instruction in the garbage collector write stub is also modified to restore writing (block 136). The incarnation number is then atomically increased (block 137).

Entry into a scoped memory area 20 is performed under mutual exclusion that covers determination of whether an entering thread activates the scoped memory area 20, increases of the incarnation number, replacement of "store" instructions in a garbage collector write stub, and determination of whether a thread must restore the "store" instruction. Other combinations of mutual exclusion are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A method for ensuring non-interfering garbage collection in a real time multi-threaded environment, comprising:
    associating an incarnation counter with a scoped memory area, wherein the incarnation counter is atomically updated upon access by a no heap thread not interruptible by garbage collection operations;
    identifying a write stub comprising instructions to store data into storage locations of the scoped memory area, wherein the instructions are dynamically modified to interrupt execution of a garbage collection thread; and
    executing a garbage collection thread over the scoped memory area, comprising at least one of:
        attempting a read from the scoped memory area, comprising:
            reading an incarnation number from the incarnation counter of the scoped memory area and locally storing the incarnation number;
            loading a value from a storage location in the scoped memory area and rereading the incarnation number; and
            comparing the reread incarnation number with the locally stored incarnation number and interrupting the garbage collection thread when the reread and locally stored incarnation numbers fail to match; and
        attempting a write to the scoped memory area, comprising
            executing the instructions in the write stub, comprising one of storing data into a location in the scoped memory area and interrupting execution of the garbage collection thread.

2. A method according to claim 1, further comprising:
performing a memory barrier subsequent to the loading of the value from the storage location in the scoped memory area.

3. A method according to claim 1, further comprising:
maintaining heap storage, wherein the storage locations in the scoped memory area can contain references to storage locations in the heap storage.

4. A method according to claim 3, further comprising:
limiting storing of the references to the storage locations in the heap storage into the scoped memory area to a real time thread.

5. A method according to claim 3, further comprising:
determining, upon entry of the scoped memory area by a thread, whether the scoped memory area is active; and
performing a modification of the instructions of the write stub and an updating of the incarnation number when the scoped memory area is not active.

6. A method according to claim 5, wherein the modification, if the thread is a no heap real time thread, comprises replacing an instruction to write to a storage location of the scope memory area with an instruction to branch to a routine that interrupts the garbage collection thread.

7. A method according to claim 5, wherein the modification, if the thread is a real time thread, comprises replacing an instruction to branch to a routine that interrupts the garbage collection thread with an instruction to write to a storage location of the scope memory area.

8. A method according to claim 5, further comprising
performing, upon entry of the scoped memory area by a real time thread, replacing an instruction to branch to a routine that interrupts the garbage collection thread with an instruction to write to a storage location of the scoped memory area.

9. A method according to claim 1, wherein the updating of the incarnation number is an atomic increase of the incarnation number.

10. A method according to claim 9, wherein the incarnation number is only updated when the scoped memory area becomes not active.

11. A method according to claim 1, wherein modifications to the storage location in the scoped memory area by the no heap thread are allowed to occur independent of the garbage collection thread.

12. A method according to claim 1, wherein the no heap thread and the garbage collection execute in a multi-processor environment.

13. A computer-readable storage medium holding code for performing the method according to claim 1.

14. A system for ensuring non-interfering garbage collection in a real time multi-threaded environment, comprising:
    an incarnation counter is associated with a scoped memory area, wherein the incarnation counter is configured to be atomically updated upon access by a no heap thread not interruptible by garbage collection operations;
    a write stub comprising instructions to store data into storage locations of the scoped memory area, wherein the instructions are configured to be dynamically modified to interrupt execution of a garbage collection thread; and
    a garbage collection thread to execute over the scoped memory area, comprising at least one of:
        a read module to attempt a read from the scoped memory area, comprising:
            a read operation to read an incarnation number from the incarnation counter of the scoped memory area and to reread the incarnation number following a load operation;
            a store operation to locally store the incarnation number;
            a load operation to load a value from a storage location in the scoped memory area;
            a compare operation to compare the reread incarnation number with the locally stored incarnation number; and
            an interrupt operation to interrupt the garbage collection thread when the reread and locally stored incarnation numbers fail to match; and
        a write module to attempt a write to the scoped memory area, comprising:
            an execute operation to execute the instructions in the write stub, comprising one of storing data into a location in the scoped memory area and interrupting execution of the garbage collection thread.

15. A system according to claim 14, further comprising:
a memory barrier to be performed subsequent to the loading of the value from the storage location in the scoped memory area.

16. A system according to claim 14, further comprising:
heap storage, wherein the storage locations in the scoped memory area can contain references to storage locations in the heap storage.

17. A system according to claim 16, wherein storing of the references to the storage locations in the heap storage into the scoped memory area is limited to a real time thread.

18. A system according to claim 16, further comprising:
an operation to determine, upon entry of the scoped memory area by a thread, whether the scoped memory area is active; and
an operation to perform a modification of the instructions of the write stub and an updating of the incarnation number when the scoped memory area is not active.

19. A system according to claim 18, wherein the modification, if the thread is a no heap real time thread, comprises replacing an instruction to write to a storage location of the scope memory area with an instruction to branch to a routine that interrupts the garbage collection thread.

20. A system according to claim 18, wherein the modification, if the thread is a real time thread, comprises replacing an instruction to branch to a routine that interrupts the garbage collection thread with an instruction to write to a storage location of the scope memory area.

* * * * *